(12) United States Patent
Escobedo (10) Patent No.: US 10,111,393 B1
(45) Date of Patent: Oct. 30, 2018

(54) PLANT POTS WITH STABILIZING STAKES AND RELATED METHODS

(71) Applicant: Frank Escobedo, Miami, FL (US)

(72) Inventor: Frank Escobedo, Miami, FL (US)

( * ) Notice: Subject to any disclaimer, the term of this patent is extended or adjusted under 35 U.S.C. 154(b) by 249 days.

(21) Appl. No.: 15/257,144

(22) Filed: Sep. 6, 2016

Related U.S. Application Data (63) Continuation-in-part of application No. 15/182,976, filed on Jun. 15, 2016.

(51) Int. Cl.
    *A01G 9/12*     (2006.01)
    *A01G 27/00*     (2006.01)
    *A01G 9/029*     (2018.01)
    *A01G 2/20*     (2018.01)

(52) U.S. Cl.
    CPC ........... *A01G 9/124* (2013.01); *A01G 2/20* (2018.02); *A01G 9/029* (2018.02); *A01G 27/008* (2013.01)

(58) Field of Classification Search
    CPC ........... A01G 9/124; A01G 9/122; A01G 9/12
    See application file for complete search history.

(56) References Cited

U.S. PATENT DOCUMENTS

| | | | | |
|---|---|---|---|---|
| 4,151,680 A * | 5/1979 | Sena | ........................ | A01G 9/022 47/39 |
| 4,841,670 A * | 6/1989 | Bitter | ..................... | A01G 7/045 47/47 |
| 6,446,388 B2 * | 9/2002 | Masello | ................. | A01G 27/06 47/80 |
| 7,637,055 B2 * | 12/2009 | Donaldson | ............... | A01G 9/02 47/45 |
| 7,966,768 B2 * | 6/2011 | DiPaolo | ................. | A01G 9/124 47/39 |
| 8,166,704 B1 * | 5/2012 | Sydlowski | ........... | A01G 27/005 47/48.5 |
| 8,857,103 B1 * | 10/2014 | Coon | ..................... | A01G 9/124 47/45 |
| 9,943,041 B2 * | 4/2018 | Harger | .................... | A01G 17/06 |
| 2009/0056217 A1 * | 3/2009 | DiPaolo | .................... | A01G 9/12 47/70 |
| 2009/0133326 A1 * | 5/2009 | Donaldson | ............... | A01G 9/02 47/47 |
| 2015/0047258 A1 * | 2/2015 | Lewis | ..................... | A01G 9/023 47/66.6 |
| 2015/0101248 A1 * | 4/2015 | Adkinson | .............. | A01G 27/00 47/70 |
| 2017/0127621 A1 * | 5/2017 | Harger | ................... | A01G 9/124 |

* cited by examiner

*Primary Examiner* — Kristen C Hayes
(74) *Attorney, Agent, or Firm* — Allen Dyer Doppelt & Gilchrist (57) ABSTRACT

A plant pot assembly includes a plant pot defining an inner volume, having an upper pot edge and including a mounting flange. A plurality of peripheral stakes attached to the mounting flange extend upwardly therefrom around the upper pot edge. The mounting flange defines a plurality of stake mounting holes, and each of the plurality of peripheral stakes includes a lower stake portion received in a respective one of the plurality of stake mounting holes. The plant pot assembly further includes a drainage system and a feeding system.

2 Claims, 8 Drawing Sheets

PLANT POTS WITH STABILIZING STAKES AND RELATED METHODS

CROSS-REFERENCE TO RELATED APPLICATION

This application is a continuation-in-part of U.S. application Ser. No. 15/182,976 filed on Jun. 15, 2016, the content of which application is herein incorporated by reference in its entirety.

FIELD OF THE INVENTION

The present invention relates to plant pots, more particularly to pots having detachable supporting stakes, a drainage system and a feeding system.

BACKGROUND OF THE INVENTION

A problem associated with growing plants in conventional flower pots, e.g. vegetables, has been the lack of mechanical support above the pot and the lack of drainage and air circulation below the pot. The upper parts of plants, where the fruits, vegetables or flowers are normally found, must be nurtured and exposed to light for optimal growth. With no means to support the weight of a growing vine or branches, the upper part of a plant is easily bent, broken, or pulled downward by the force of gravity, potentially decreasing its exposure to light and limiting the nurturing of fruits, vegetables or flowers attached thereto. The lack of a means for even watering, feeding and draining of the plant can promote the accumulation of excess water and prevent the roots from absorbing nutrients. Various plant pots have been developed for optimal plant growing, but further improvements are possible.

SUMMARY OF THE INVENTION

In view of the foregoing, an object of the present invention is to provide an improved plant pot with stabilizing stakes, a drainage system, a feeding system and related features and methods. According to one embodiment of the invention, the plant pot assembly includes a plant pot defining an inner volume, having an upper pot edge and including a mounting flange. A plurality of peripheral stakes can be attached to the mounting flange and extend upwardly therefrom around and above the upper pot edge. A drainage plate is configured to be positioned above the bottom surface of the plant pot. The bottom pot surface and/or the drainage plate comprises a plurality of ridges for the drainage plate to rest thereon, thereby creating a drainage chamber. The plant pot assembly further comprises at least one ventilation channel extending between the upper edge and the drainage plate along at least one sidewall of the plant pot.

These and other objects, aspects and advantages of the present invention will be better appreciated in view of the drawings and following detailed description of preferred embodiments.

DETAILED DESCRIPTION OF A PREFERRED EMBODIMENT

Figure 1:
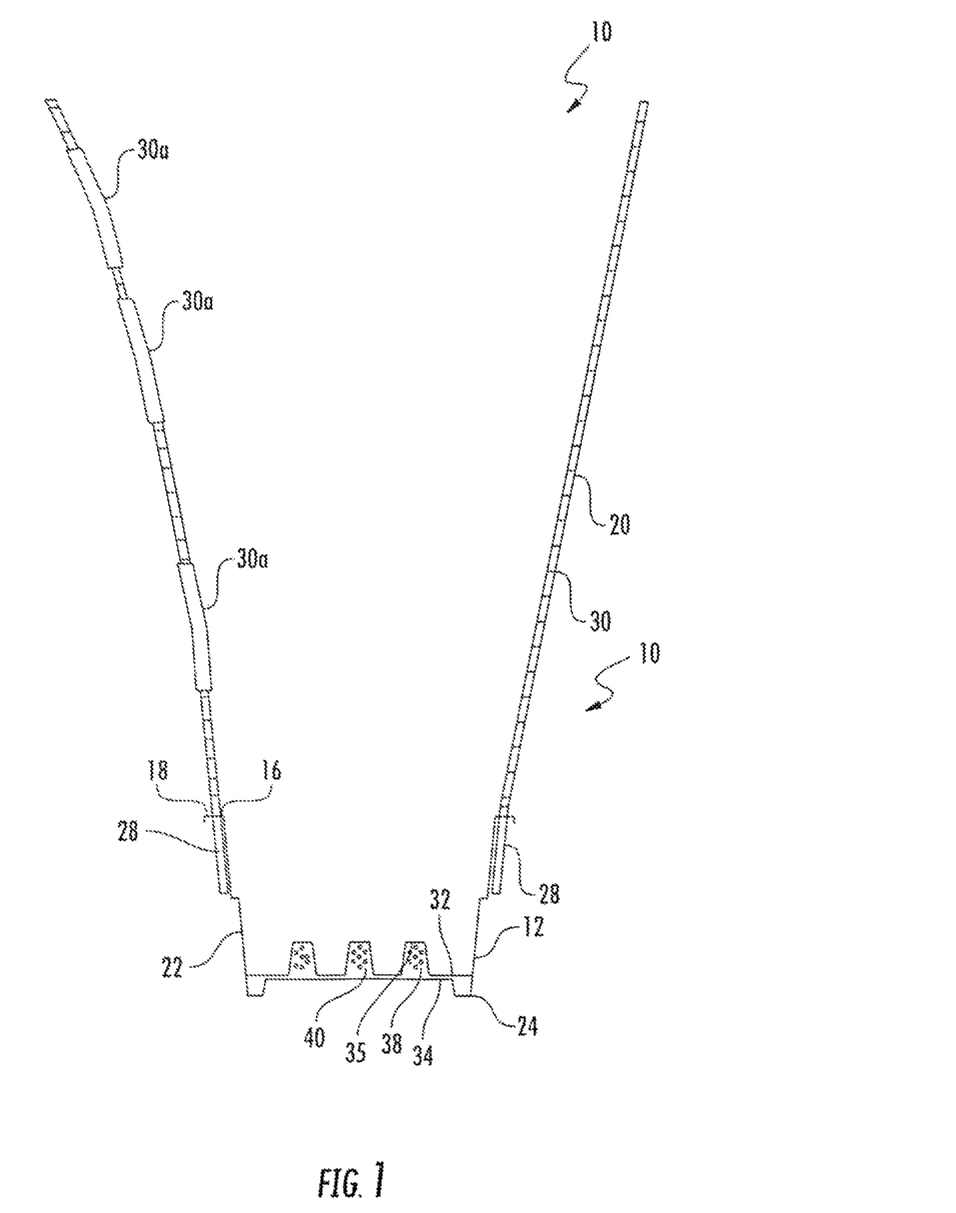
FIG. 1 is a cross section view of a plant pot assembly according to an embodiment of the present invention.

According to an embodiment of the present invention, and referring to FIG. 1, a plant pot assembly 10 includes a plant pot 12 defining an interior volume 14 having an upper pot edge 16 including a mounting flange 18. A plurality of peripheral stakes 20 are attached to and supported at the mounting flange 18 and extend upwardly therefrom around the upper pot edge 16. Each of the plurality of peripheral stakes 20 includes a lower stake portion 28 and at least one upper stake portion 30.

Figure 4:
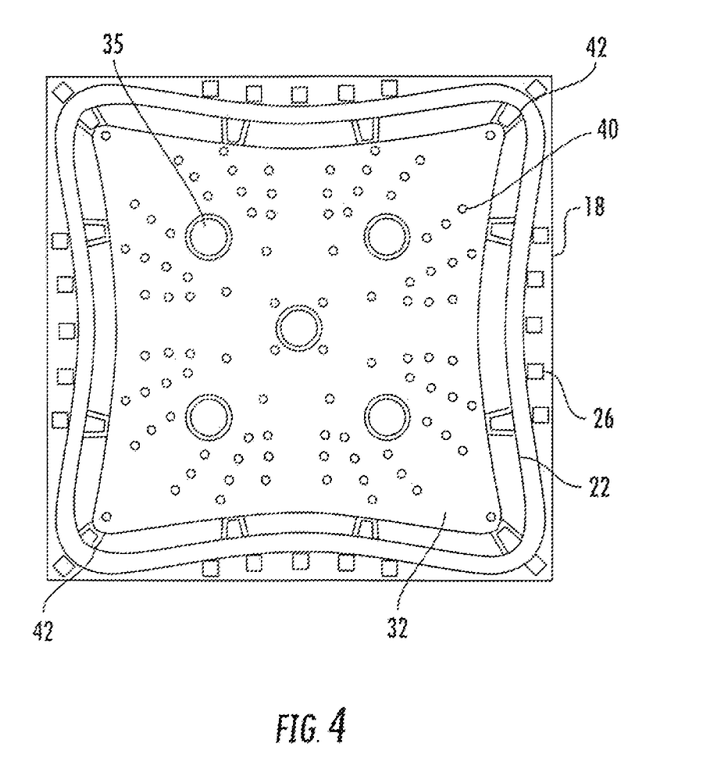
FIG. 4 is a top view of the plant pot assembly of FIG. 2.
Figure 5:
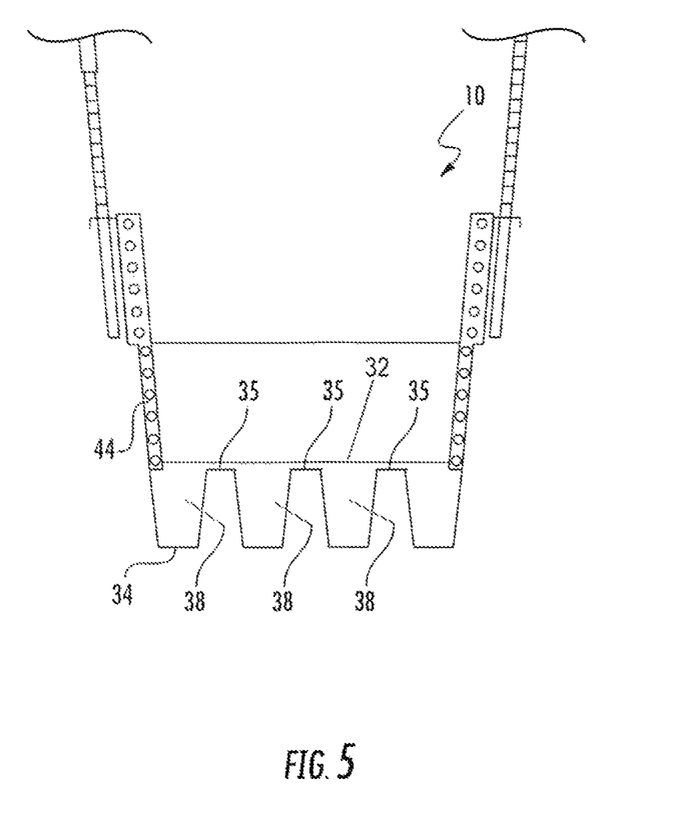
FIG. 5 is a cross section view of a plant pot assembly according to another embodiment of the present invention.

The plant pot 12 can be different shapes. For example, referring to FIGS. 4 and 5, the plant pot 12 can have a tapered square shape with radius corners between sidewalls 22. The radius corners function to reduce internal stress. In the depicted embodiment, the pot 12 has a square cross section with trapezoidal sidewalls 22. The upper edge 16 has a larger perimeter than the lower edge 24. The upper edge 16 can also have one or more concave curves to reduce the concentration of stress while providing sufficient space for the mounting flange 18, as shown in FIG. 5. The pot 12 can also adopt a polygonal cross section or some other desired shape of cross section. In the depicted embodiment, the sidewalls 22 are sloped approximately 5 degrees outboard from bottom to top so that the surface area of the pot 12 is maximized at the top, enabling multiple pots 12 to be stacked for storage and shipment. The plant pot 12 can adopt any desired dimension as needed. The plant pot 12 can be covered with embossed and printed patterns. The pot 12 can be made out of clay, ceramic, plastic, or any other suitable materials.

Figure 2:
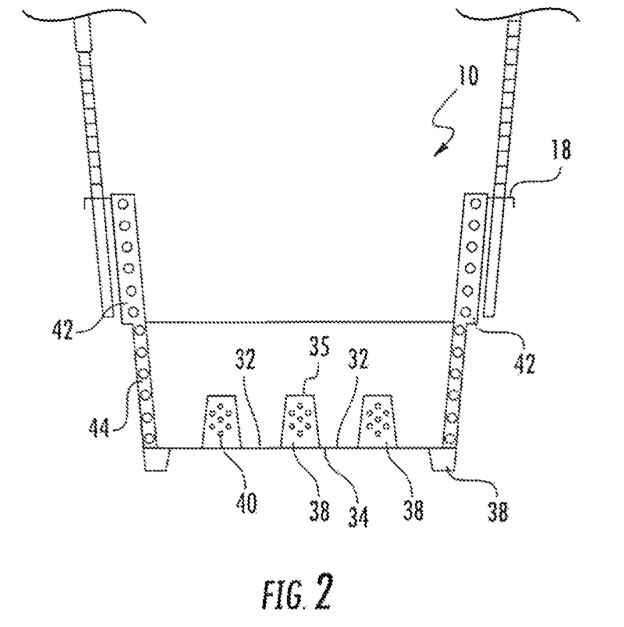
FIG. 2 is a cross section view of a plant pot assembly according to another embodiment of the present invention.
Figure 3:
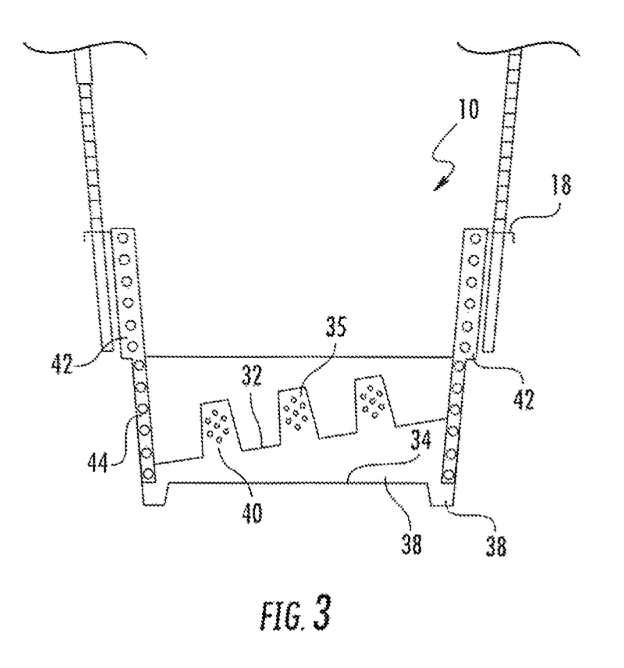
FIG. 3 is another cross section view of the plant pot assembly of FIG. 2.

Referring to FIGS. 1-3, a plurality of drainage and aerating cavities can be formed as desired on the bottom surface 34 of the pot 12. A plurality of legs 36 are also integrally formed on the bottom surface 34 to offset a certain length from the bottom surface 34. For example, four legs 36 are formed at the four corners of the bottom surface 34 of the square-shaped pot 12. The plurality of legs 36 can also include drainage cavities. When multiple plant pots 12 are stacked, the upper edge 16 and the legs 36 of adjoining plant pots will stack in a regular array and hold the plant pots firmly in place.

The plant pot assembly 10 also includes a drainage plate 32 adapted to be positioned above the top of bottom surface 34. The drainage plate 32 includes one or more ridges 35 formed from the flat portion of the plate 32, as shown in FIGS. 1-4. As such, at least a portion of the plate 32 is held at a certain altitude above the bottom surface 34, thereby creating a drainage chamber 38 therebetween. In an alternative embodiment, a plurality of ridges 35 rise up from the bottom surface 34 and a flat drainage plate with a plurality of drainage holes can be placed above the ridges 35, as shown in FIG. 5. As such, a drainage chamber 38 can be created between the drainage plate 32 and the bottom surface 34. The ridges 35 can be different shapes, dimensions and/or formed at different location of the drainage plate 32 or bottom surface 34. Planter soil and a plant are positioned on the top of the plate 32. A plurality of drainage holes and/or apertures 40 of appropriate size on flat portion and/or the sidewall of the ridges 35 can be formed on the plate 32 to drain excess liquid to the drainage chamber 38 while retaining most of the soil or growth medium for the plant. The bottom surface 34 can also include a plurality of drainage holes and/or apertures 40. The drainage plate 32 enables a plant to be aggressively fed with minimal risk of soil contamination and root rot. When a plant is transited from one pot to another or a new location, the plate 32 also can be moved along with the plant, allowing faster and less problematic plant transition and easy pot clean-up, as shown in FIG. 3. When a new plant is planted in the pot 12, a new plate 32 can be used to prevent cross-contamination or soil exhaustion from a previous plant.

Referring to FIGS. 2-5, the plant pot assembly 10 also includes ventilation channels 42 along the sidewalls 22 to improve air circulation along the sidewalls 22 and more uniform soil moisture content and drainage of the fluids, as shown in FIG. 2. The ventilation channel 42 extends between the upper edge 16 and the bottom surface 34. The ventilation channel 42 is a channel with a plurality of ventilation holes 44 formed on the sidewall thereof. The ventilation channels 42 can be placed at the corners and/or along the sidewalls 22 as needed. The ventilation channels 42 can follow the profile of the sidewall 22. In the depicted embodiment, a flat step is formed between a lower section and an upper section of the pot 12 to enable the ventilation channel 42 to be fixed securely to the sidewall 22. If soil should accumulate in the ventilation channels 42, a wand-type suction tube can be extended into the ventilation channels 42 to clear the soil. The ventilation channels 42 can be added and removed as needed, and the location of the ventilation channels 42 can be adjusted as desired.

Figure 6:
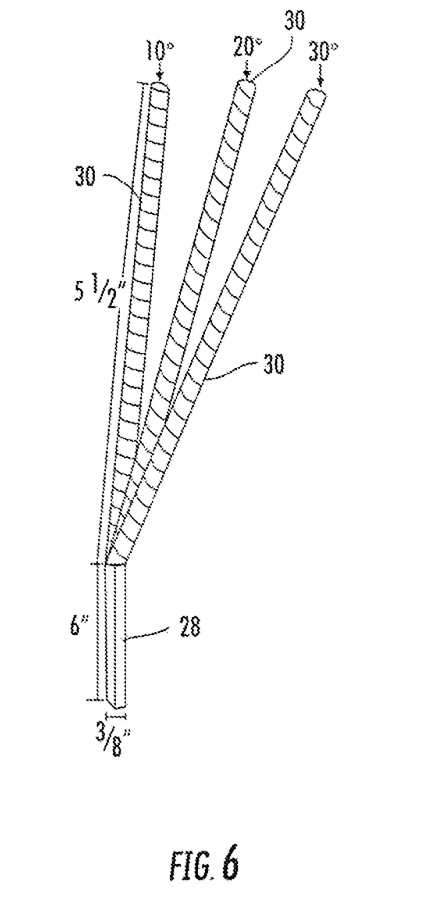
FIG. 6 is a perspective view of a peripheral stake of a plant pot assembly, according to one embodiment of the present invention.
Figure 7:
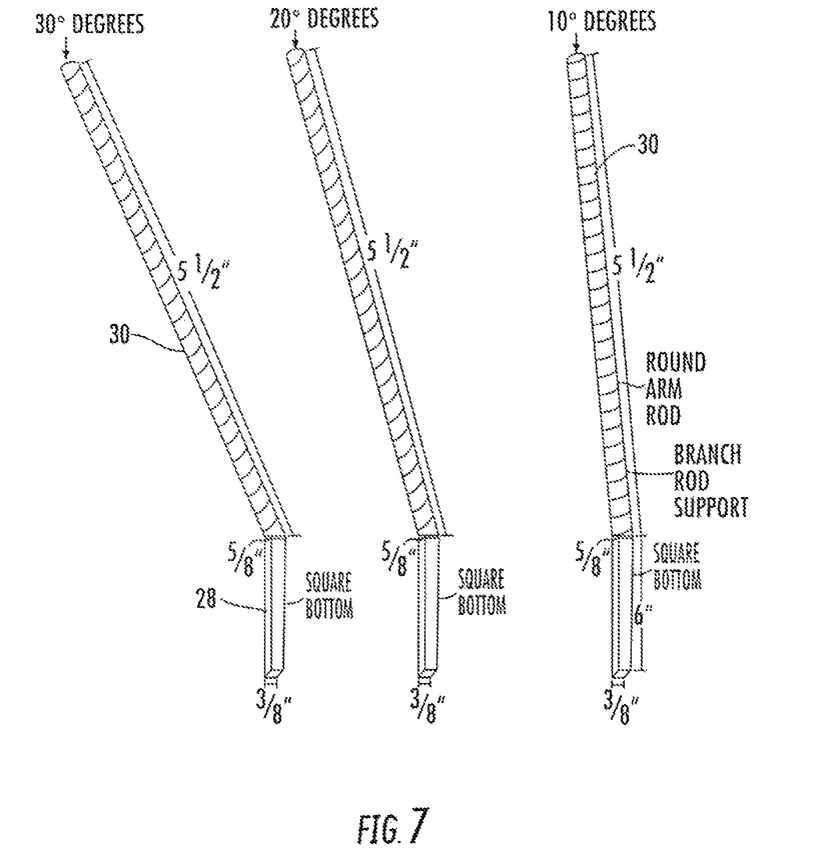
FIG. 7 is a perspective view of a plurality of peripheral stakes of a plant pot assembly, according to another embodiment of the present invention.

Referring to FIGS. 6-7, the mounting flange 18 defines a plurality of stake mounting holes 26 and the lower portion 28 of each of the plurality of peripheral stakes 20 is received in a respective one of the plurality of stake mounting holes 26. In one embodiment, the cross sections of the plurality of mounting holes 26 and of the lower stake portion 28 of the plurality of peripheral stakes 20 are square. The area of the square cross section of the lower stake portion 28 is slightly smaller than the area of the mounting holes 26 on the flange member 18, allowing the peripheral stakes 20 to be inserted therethrough and closely accommodated in the mounting holes 26. The square-shape design will ensure that the peripheral stakes 20 cannot rotate inside the mounting holes 26 but will instead largely be fixed in a specific orientation. In the depicted embodiment, the plurality of mounting holes 26 are square shaped with a side dimension of 518 inches and spaced one inch apart. However, other suitable shapes, dimensions and space arrangements for the mounting holes 26 can be used. The mounting flange 18 can be made of plastic or any other polymeric materials with required rigidity and strength.

The plurality of peripheral stakes 20 can be attached to the mounting flange 18 and detached at will. One or more peripheral stakes 20 can be added, removed or replaced as needed. The mounting direction of one or more of the plurality of peripheral stakes 20 can also be adjusted as desired.

Referring to FIGS. 1-3 and 6-7, the plurality of stakes 20 are elongated rods. Each of the plurality of peripheral stakes 20 has at least one upper portion 30 on the opposite side of the lower portion 28. The lower portion 28 is vertical and the at least one upper portion 30 forms at least one specific angle with the lower portion 28. As shown in FIGS. 6-7, the angles between the lower portion 28 and the at least one upper portion 30 are 10 degrees, 20 degrees and 30 degrees, respectively. Other angles (e.g., 0 degree, 40 degrees, etc.) can also be used when desired. For example, peripheral stakes with larger angles (e.g., 40 degrees) may be used to support large and mature plant, and peripheral stakes with smaller angles (e.g., 10 degrees) may be used to support young and tender plants. When a peripheral stake 20 has more than one upper portion 30, as shown in FIG. 7, the multiple upper portions 30 with 10, 20 and 30 degrees angle can be in the same plane or different planes. In the depicted embodiment, the upper portion 30 is 5 feet and 6 inches in length and the lower portion 28 is 6 inches in length. However, other suitable dimensions of peripheral stakes 20 can be used. The peripheral stakes 20 can be made out of plastic, wood, metal, a combination thereof, or other materials with suitable strength and rigidity. Referring back to FIG. 1, the lower portion 28 is generally vertical and the upper portion 30 includes a plurality of gradually increased angle sections (e.g., 5 degree, 10 degree, 15 degree, etc.). A plurality of connecting joints or wrapper tubes 30a can be placed on junctions of different angle sections to reinforce the joint of different angle sections. The wrapper tubes 30a are preferably made or plastic or other suitable materials.

The lower portion 28 of a peripheral stake 20 can have a different cross section shape than the upper portion 30 of the peripheral stake 20. For example, the lower portion 28 has a square cross section and the at least one upper portion 30 has a circular cross section, though other cross-sections or combination of cross section will be possible. The cross section of the mounting holds 26 on the mounting flange 18 will match the cross section of the lower portion 28.

In one embodiment, the lower portion 28 of each of the plurality of stakes 20 is marked with a specific color to indicate a specific angle formed between the upper portion 30 and the lower portion 28. For example, yellow corresponds to an upper portion 30 that forms 30 degree angle with the low portion 28. Green corresponds to an upper portion that forms 20 degrees angle with the lower portion. Red corresponds to an upper portion that forms 10 degrees angle with the lower portion.

Figure 8:
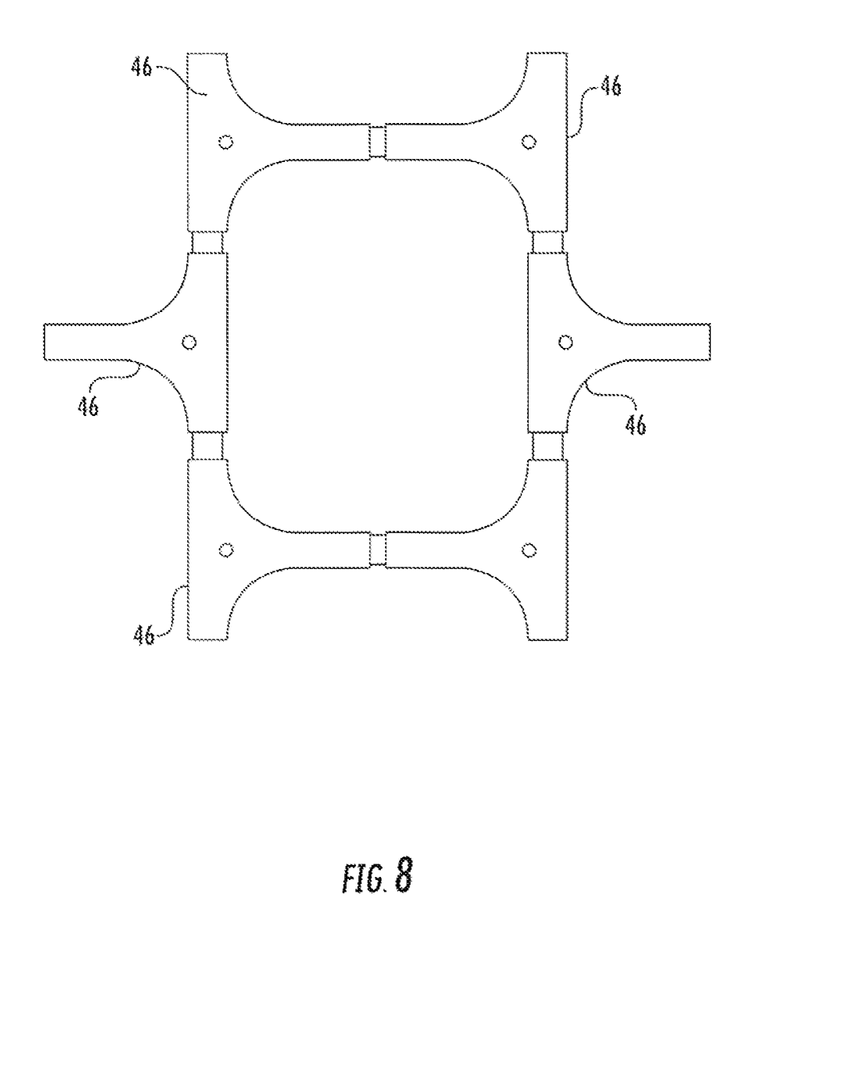
FIG. 8 is a top view of a plurality of interconnected feeding arms of a plant pot assembly according to one embodiment of the present invention.
Figure 9:
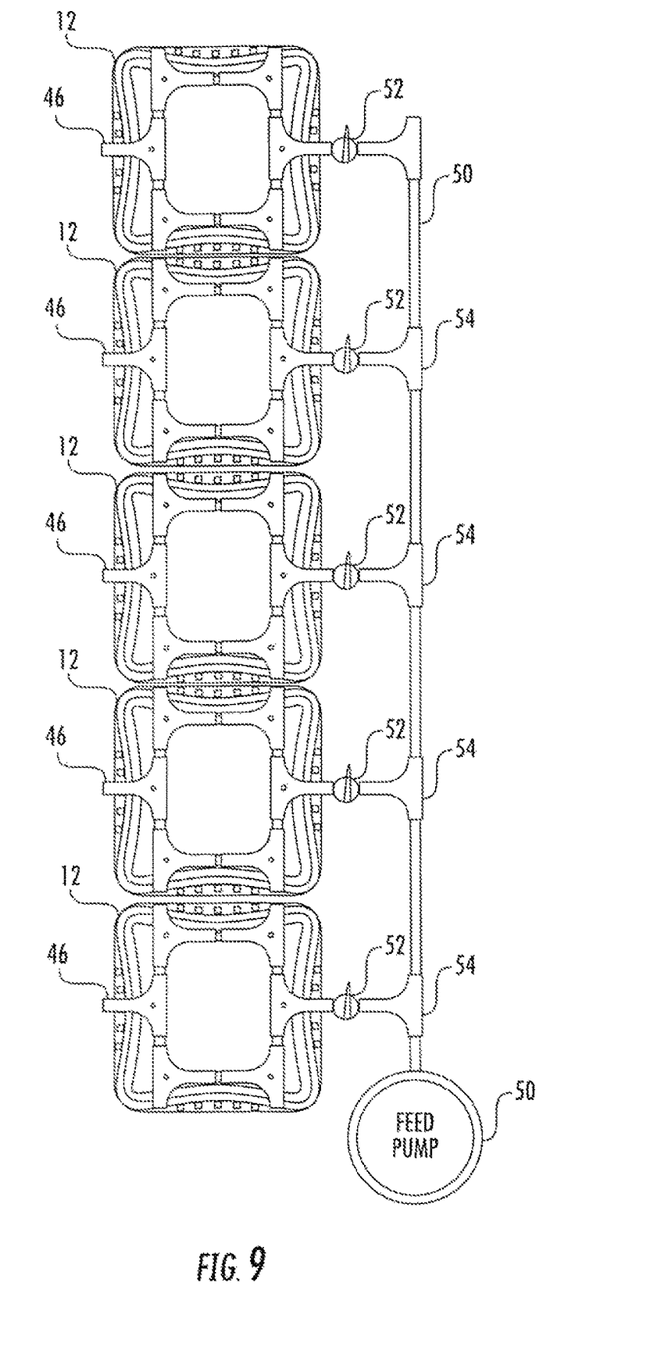
FIG. 9 is a top view of a plurality of plant pot assemblies affixed to a common feeding source.

Referring to FIGS. 8-9, the plant pot assembly 10 further includes one or more feeding arms 46 with a plurality of spray nozzles 48 spaced on each feeding arm 46. The plurality of feeding arms 46 can be connected via one or more connection conduits 54. The one or more feeder arms 46 are connected to a supply hose 50. In the depicted embodiment, a valves 52 connected to respective hose adaptor 54 are interposed between the feeding arm 46 and a feeding source. The valve 52 is configured to turn on, turn off, and/or adjust the amount of suitable fluid passing through the valves 52. As such, the spraying pressure of spray nozzle 48 can be adjusted via the valves 52. The spray nozzles 48 can also be configured to rotate certain degrees relative to the plane of the feeding arm 46. The combination of adjusted pressure, together with rotating spraying nozzles 48 can form an evenly distributed and desired amount of feeding to the plant. In the depicted embodiment, the hose adaptor 54 is T-shaped and positioned horizontally. The hose adaptor 54 can also be placed vertically or other suitable positions. The hose adaptors 54 can be further connected to the supply hose 50. A plurality of feeding arms 46 can be interconnected to correspond to the dimension and upper edge of the pot 12. The one or more feeding arms 46 and valves 52 can control the location and amount of water and liquid feeding to achieve even watering and avoid dry spots of plants, thereby encouraging deeper rooting.

A method for stabilizing and feeding plants using a plant pot assembly 10 includes selecting a plurality of peripheral stakes 20 to be attached to a mounting flange 18 of the plant pot 12, based on, for example, size, shape, and/or species of a plant deposited in the pot. The selected plurality of peripheral stakes are attached to the mounting flange 18 such that the peripheral stakes 20 extend upwardly therefrom around the upper pot edge 16. The directions of the plurality of stakes 20 can be adjusted to form a desired support boundary. A drainage plate 32 is placed on the bottom surface 34. A plant is disposed in a plant pot 12 and supported by the boundary formed by the peripheral stakes 20. Soil can be packed before or after a plurality of peripheral stakes 20 are attached to the plant pot 12. One or more branches of the plant can be tied to one or more of the plurality of peripheral stakes 20. A plurality of ventilation channels 42 can be placed along the sidewall of the pot 12. One or more feeding arms 46 can be placed over the upper edge 16 of the pot 12. The plant can be watered evenly via the one or more feeding arms 46. Excess fluid will not accumulate inside the pot but drain through the drainage plate 32 and the ventilation channel 42.

From the foregoing, it will be appreciated that a plant pot assembly according to the present invention supports plants in a pot with easily assembled parts so that the plants are held firmly in position in the pots. The assembly is readily adaptable to a wide range of plant sizes from a variety of purposes. The present invention also provides for a full circulation of air, water and nutrients in the pots so that the root system of the plants will have an optimum growth environment.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A plant pot assembly comprising:
   a plant pot defining an interior volume having an upper pot edge including a mounting flange;
   a plurality of peripheral stakes attached to the mounting flange and extending upwardly therefrom around the upper pot edge; and
   a drainage plate configured to be positioned above a bottom surface of the plant pot; and
   wherein at least one of the bottom surface and drainage plate comprises a plurality of ridges that enables the drainage plate to be held at a certain altitude above the bottom surface, creating a drainage chamber therebetween;
   wherein each of the plurality of stakes has a vertical lower portion and at least one upper portion, and wherein each upper portion forms at least one specific angle with the vertical lower portion; and
   wherein the angle between the vertical lower portion and the at least one upper portion range from 5 degrees to 40 degrees.

2. A plant pot assembly comprising:
   a plant pot defining an interior volume having an upper pot edge including a mounting flange;
   a plurality of peripheral stakes attached to the mounting flange and extending upwardly therefrom around the upper pot edge; and
   a drainage plate configured to be positioned above a bottom surface of the plant pot; and
   wherein at least one of the bottom surface and drainage plate comprises a plurality of ridges that enables the drainage plate to be held at a certain altitude above the bottom surface, creating a drainage chamber therebetween;
   wherein each of the plurality of stakes has a vertical lower portion and at least one upper portion, and wherein each upper portion forms at least one specific angle with the vertical lower portion;
   wherein the lower portion of each of the plurality of stakes is marked with a specific color indicating a specific angle related to a corresponding upper portion.

* * * * *